United States Patent [19]
Ehrick

[11] Patent Number: 5,784,836
[45] Date of Patent: Jul. 28, 1998

[54] DEMOUNTABLE COMFORT MODULES FOR PASSENGER AIRCRAFT

[75] Inventor: Stephen D. Ehrick, Yorba Linda, Calif.

[73] Assignee: BE Aerospace, Inc., Wellington, Fla.

[21] Appl. No.: 333,967

[22] Filed: Nov. 3, 1994

[51] Int. Cl.$^6$ ............................................. E04H 1/00
[52] U.S. Cl. ................... 52/79.8; 5/9.1; 52/79.7; 52/79.8; 52/36.4; 52/DIG. 14; 244/118.5
[58] Field of Search .................. 52/28, 34, 36.4, 52/DIG. 11, DIG. 14, 79.7, 79.8, 79.9, 186; 244/118.5, 118.6; 5/8, 9.1, 118, 513

[56] References Cited

U.S. PATENT DOCUMENTS

| | | |
|---|---|---|
| 3,632,064 | 1/1972 | Oliver . |
| 3,898,704 | 8/1975 | Gallaher et al. . |
| 4,071,210 | 1/1978 | Mutke . |
| 4,550,457 | 11/1985 | Dukkers . |
| 4,594,817 | 6/1986 | McLaren et al. .......................... 52/34 |
| 4,866,833 | 9/1989 | Ward ..................................... 52/79.8 X |
| 5,028,088 | 7/1991 | Del Monico et al. . |
| 5,111,626 | 5/1992 | Fortune ................................. 52/34 X |
| 5,314,143 | 5/1994 | Luria .................................. 244/118.5 X |
| 5,395,075 | 3/1995 | Sprenger et al. .................... 244/118.5 |
| 5,487,240 | 1/1996 | Miller .................................. 52/79.8 X |

FOREIGN PATENT DOCUMENTS

| | | |
|---|---|---|
| 0 035 955 | 9/1981 | European Pat. Off. . |
| 0 514 650 | 11/1992 | European Pat. Off. . |
| 2 256 857 | 9/1975 | France . |

OTHER PUBLICATIONS

Abstract (in English), Derwent Info Ltd., patent search for English language equivalent patent family members corresponding to European Publication No. 0 514 650 (A1).

Primary Examiner—Carl D. Friedman
Assistant Examiner—Beth Aubrey
Attorney, Agent, or Firm—Merchant, Gould, Smith, Edell, Welter & Schmidt

[57] ABSTRACT

A removable sleeping compartment assembly for the use of a number of passengers is provided based upon the nesting together of a number of different modules, typically having a standard cargo container configuration, that incorporates internal sleeping berths and convenience features in such manner so as to provide a number of individual habitats. The modules are configured with at least partially open abutting sides which may have upper and lower berths, separated by aisles, and isolated by enclosure elements. Appurtenances in the modules protrude through the open sides to nest into the adjoining space when the assembly is joined together. The convenience features include restroom facilities, storage and disposable supply means, and means for providing convenient entry into and exit from the interior of the volume defined by the unitary assembly.

4 Claims, 6 Drawing Sheets

DEMOUNTABLE COMFORT MODULES FOR PASSENGER AIRCRAFT

FIELD OF THE INVENTION

This invention relates to systems and methods for improving the convenience and versatility of aviation transport systems, and more particularly, to modular systems for enabling airlines and airline passengers to meet special needs and create new modes in air travel.

BACKGROUND OF THE INVENTION

Large passenger aircraft which undertake long non-stop flights necessarily place passengers and crew under a special type of stress and discomfort. As hours pass, time zones change and normal living routine is upset. In consequence, many aircraft have special compartments in which operating crew members can rest in rotation, so as to remain refreshed for later stages of the flight. In the earlier years of air travel, some airlines included berths in the passenger cabins to enable passengers to attempt to sleep during flight. Accommodations of this type are not known to be used with any regularity except in executive and private luxury aircraft at this time. Instead, airlines prefer to attempt to provide a measure of comfort, particularly for first class and business class passengers, by providing seats with augmented padding and extended angles of reclination, and ample room for body movement without disturbing adjacent passengers. Given the unavoidable activity involved in passenger flight, and the inability to isolate passengers, as well as the problems inherent in sleeping in a seat, however it is reclined, these systems can only be said to, at best, reduce the level of discomfort. Something else would be preferable for those who must travel for specific purposes and wish to reach their destination in a well-rested condition and at a high energy level. Regulations require that passengers be in their seats for takeoff and landing and be able to return to their seats upon reasonably short notice when required to do so. These and perhaps other factors have militated against introduction of sleeping arrangements that provide measurable improvements in comfort, accessibility, and freedom from disturbance.

There have been a number of attempts to utilize what might be called sleeping compartments in aircraft and other vehicles. For the great majority of long flights in large aircraft, cargo is loaded in container modules. The cargo compartments of aircraft are designed to receive such modules on roller surfaces so they can be manipulated manually and then secured firmly into position, but easily disengaged for unloading at destination. Depending on passenger loading, seasonal and commercial factors, some of these containers will be used solely for commercial cargo. On most passenger flights, and in some other situations, the cargo may be primarily commercial. It is also clear that there will be many predictable situations in which the available room in the cargo compartment, as well as the aircraft total weight, will permit use of the cargo compartment for other purposes, at least for longer legs of a flight. The cargo compartment is pressurized with the rest of the aircraft, but is not necessarily maintained at a comfortable temperature level.

Some suggestions have been made to incorporate sleeping modules in dedicated spaces of passenger cabins. This merely represents a variation on the sleeping berths utilized in the earlier days of commercial aviation. Other suggestions have been made as to the use of standard container modules, of which there are many different types, by converting such modules into individual sleeping compartments. Few of these modules are of suitably large internal volume to provide the comfort and conveniences that are required for more than one person and such ideas have not been pursued further, as far as is known. The goal, desirable for some people and almost necessary for others, is to be able to make a long distance flight under conditions which permit arrival without undue stress or fatigue.

SUMMARY OF THE INVENTION

Systems in accordance with the invention preferably are based upon unique individual modules having substantially the same exterior configuration, or form factor, as one of the standardized cargo containers, but nested together to define a single housing enclosing a larger volume that internally contains necessities and conveniences for individual comfort. To this end, the individual modules have open sides with individual or shared appurtenances that protrude outwardly. The protruding structures extend into adjacent compartments when the unitary structure is assembled with open sides joined together. Common areas, such as passageways, are included to allow access to and from all sleeping areas. The modules for a set also include power and accessory lines which are intercoupled during or after assembly, and means for accessing, from the interior, sources of power, communications and control functions within the aircraft. Sleeping bunks, a restroom facility, and other desirable features are arranged along the open sides of the modules so as to nest partially in the adjacent modules but be enclosed when assembly is complete. The arrangement provides efficient interior use of space, with easy access to and from the exterior via an entryway, but include curtains or walls which permit compartmentalization of the sleeping areas. Nesting of the different units is facilitated by interior positioning and locking devices which enable the compartments to be seated together and rapidly secured into the unitary structure, and disassembled to individual compartments for removal.

With this arrangement, therefore, a passenger aircraft can be converted from a seats-only configuration to one in which a number of passengers can have access to sleeping compartments for long, uninterrupted segments of a flight. For example, when an aircraft is to embark on a long distance route having both long and short segments, with passenger loading and cargo carrying requirements that permit, ground crews can quickly load the different modules of the unitary set into the cargo bay, where the crews can assemble them into the prearranged nested configuration, using the positioning and locking arrangement interior to the compartments, and then fastening the assembly into place and preparing the entryway for access. The passenger deck of the aircraft is unaffected except for a passageway for entry into the cargo-handling space. Consequently, passengers can be offered use of the sleeping compartment system after takeoff, and until the terminal portion of the long flight segment is approached. Thus, this system enables the airline to expand the services available to its customers, either on a regularly scheduled or as-available basis.

In accordance with other features of the invention, each individual sleeping volume can be isolated into a personal habitat having communications facilities, including audio and video, if desired. The habitats may each include a noise cancellation system that reduces aircraft engine noise, airflow noise, and passenger-generated sounds to a minimum, so that undisturbed comfort is assured. Together with individual environmental controls, and curtains or walls that provide isolation from other individual habitats, this ensures passenger rest without a feeling of confinement.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
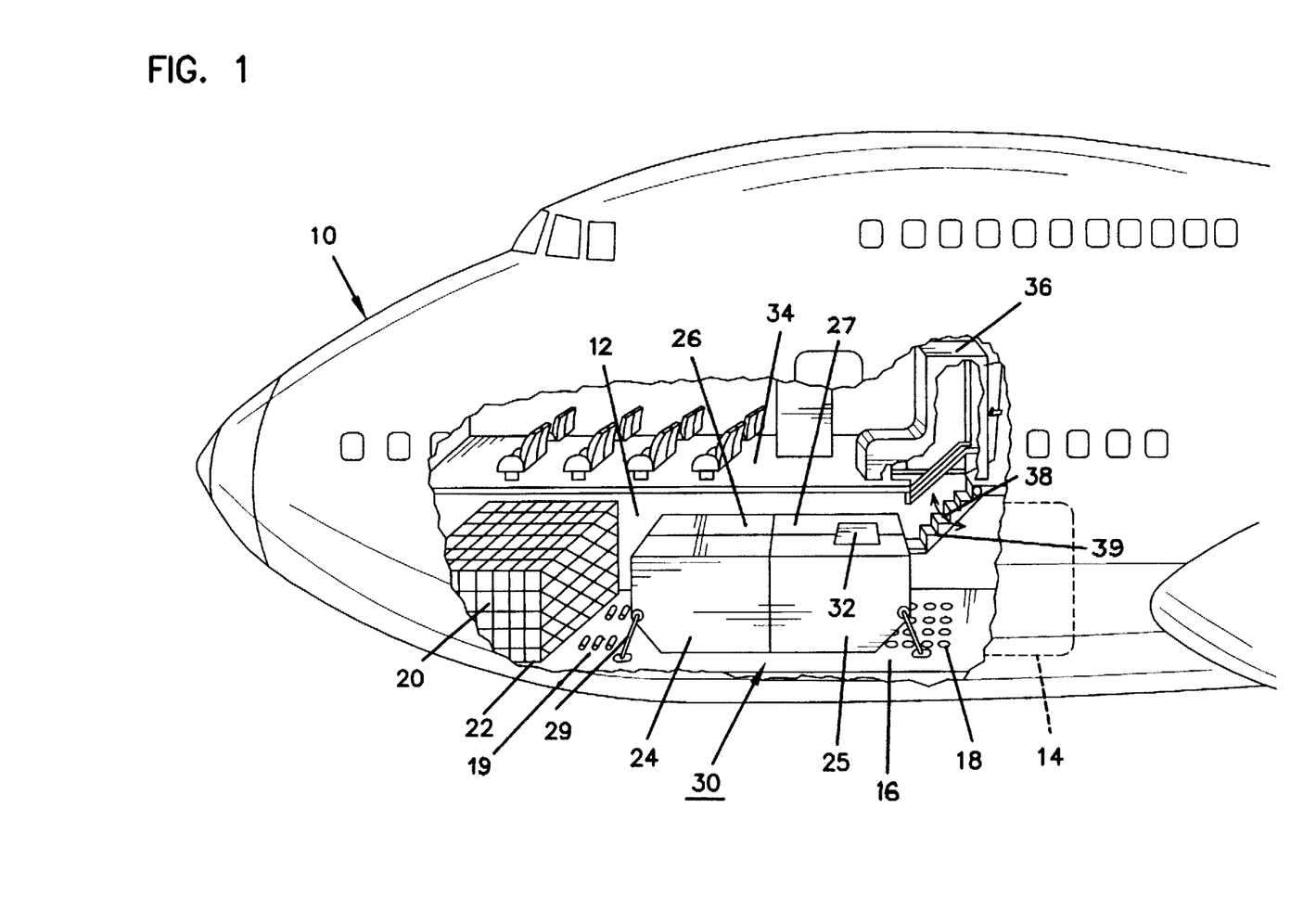
FIG. 1 is a perspective, partially broken away, of a sleeping compartment system for passenger aircraft in accordance with the invention.

The general arrangement of an installation in accordance with the invention is shown in FIG. 1, as the system would be utilized in a cargo compartment of a large passenger aircraft 10, such as a Boeing 747. The 747 has a large cargo deck 12 below the passenger compartment, only a forward bay being illustrated in general fashion in FIG. 1. This bay is accessible through a cargo door 14 large enough to receive cargo modules of a selected type. Here that type is the LD3 module, the exterior dimensions of which are 79"×60" at the upper surface, 64" high and with an angled corner for abutting against a slanted side wall of the aircraft, providing a bottom length of 61" and a height of 46" above the uppermost portion of the angled end. Conventional cargo modules 20 are shown in the front section of the forward bay, and secured to the cargo floor 16 by a cargo net 22. Rollers 18 are incorporated in at least a portion of the cargo floor 16, to permit manual or other low force positioning of containers in either of two horizontal directions relative to the floor 16. Unidirectional roller tracks 19 along the longitudinal axis of the aircraft 10 may be utilized for cargo container modules which are kept laterally separate from each other.

In the region of the cargo floor 16 in which sleeping structures in accordance with the invention are to be located are included a number of sleeping modules 24, 25, 26 and 27. These have substantially the exterior configuration of the LD3 modules but are aligned so that the long sides are parallel to the direction of the aircraft, with the slanted lower ends fore and aft. The modules 24–27 are nested and joined together to form a unitary sleeping assembly 30, secured to the cargo floor 16 by tie-down straps 29 or other suitable locking means. The assembly 30 is accessed via a top-side entryway region 32 from the passenger deck 34 through an entry chamber 36, the floor of which is shaped as a pivotal base 38 having steps 39. The steps 39 can then be pivoted down from a horizontal attitude to provide a stairway leading down from the chamber 36 to the upper side of the assembly 30. Access can also be provided by means of existing stairs, or a lift system, as incorporated in some 747-type aircraft. However, most aircraft configurations will best accept a modular entry chamber 36 together with an appropriate floor modification, which may be insertable and replaceable in accordance with the configuration. Access for the handicapped, manual or mechanical, can be installed but would probably entail further special facilities for prompt return to the passenger deck in accordance with flight requirements.

With this system, therefore, the airline or aircraft operator can offer a new service as a permanent or optional feature for long distance flights. Such capability can also be used to satisfy particular aircrew needs in excess of the crew sleeping compartments used for relief during long flights. In installing the system, the separate modules 24–27 are loaded individually through the cargo door 14, as by conventional forklift or conveyor systems. Once within the cargo deck 12, the modules 24–27 are positioned manually or with mechanical aids into the predetermined nesting configuration. One ground crew member stays inside a module as the others are nested into place, to lock the compartments together from the inside. Interconnections between the compartments are also made, with the buses and conduits being coupled to an external source in the airframe, as the assembly 30 is fixed in place using the tie down straps 29. The crew member may then prepare the entryway 32, and leave the assembly 30, which is ready for use in flight.

After takeoff and after a suitable altitude has been reached, passengers who are to use the unitary sleeping assembly 30 are directed via the entry chamber 36 and the steps 38 down onto the top of the assembly 30. They move through the top-side entry 32, descend into the interior of the assembly 30, and find their individual habitats for rest and seclusion, moving along the aisles after reaching the floor level.

Figure 2:
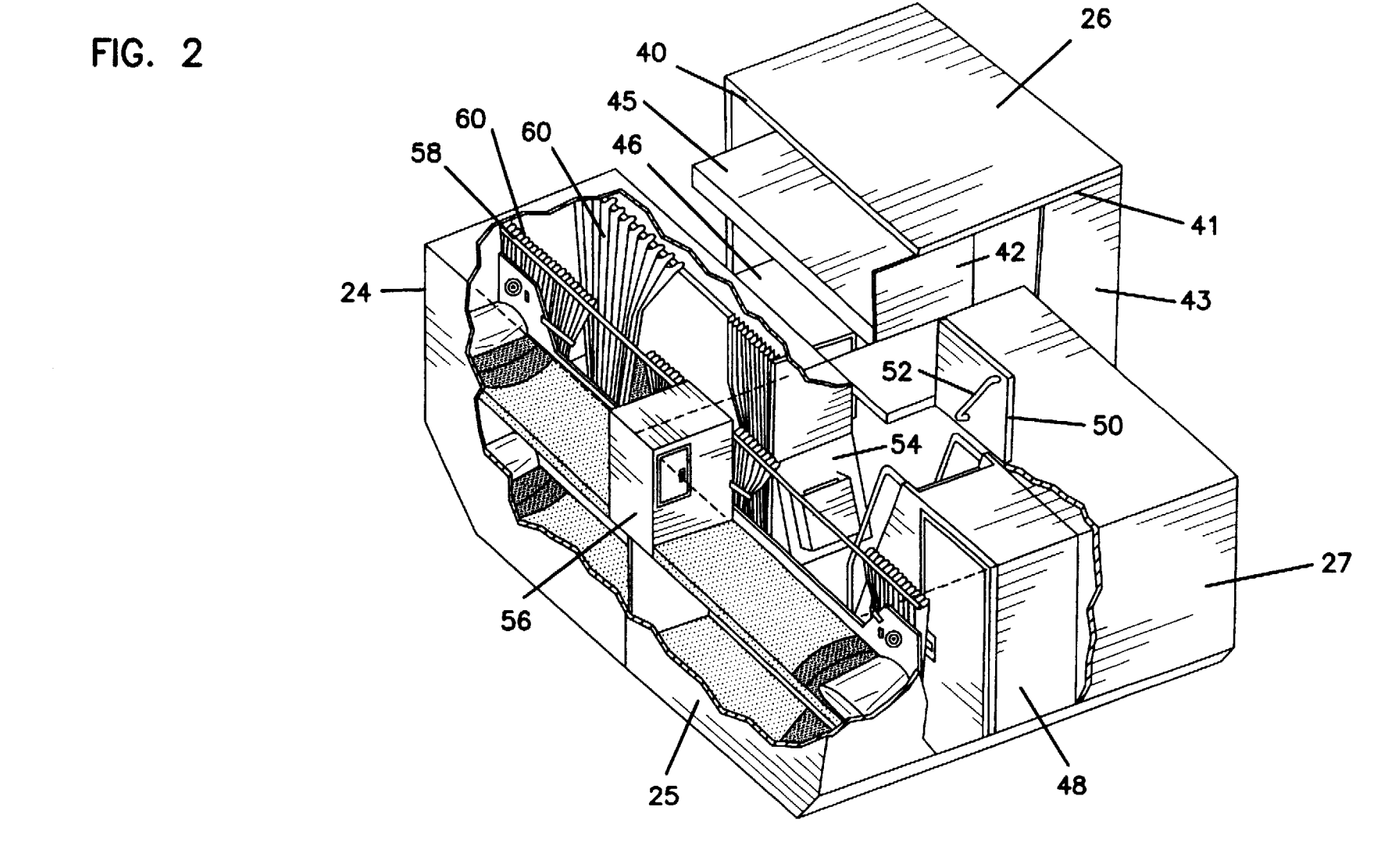
FIG. 2 is a partially exploded view of the individual compartments in the system of FIG. 1.
Figure 3:
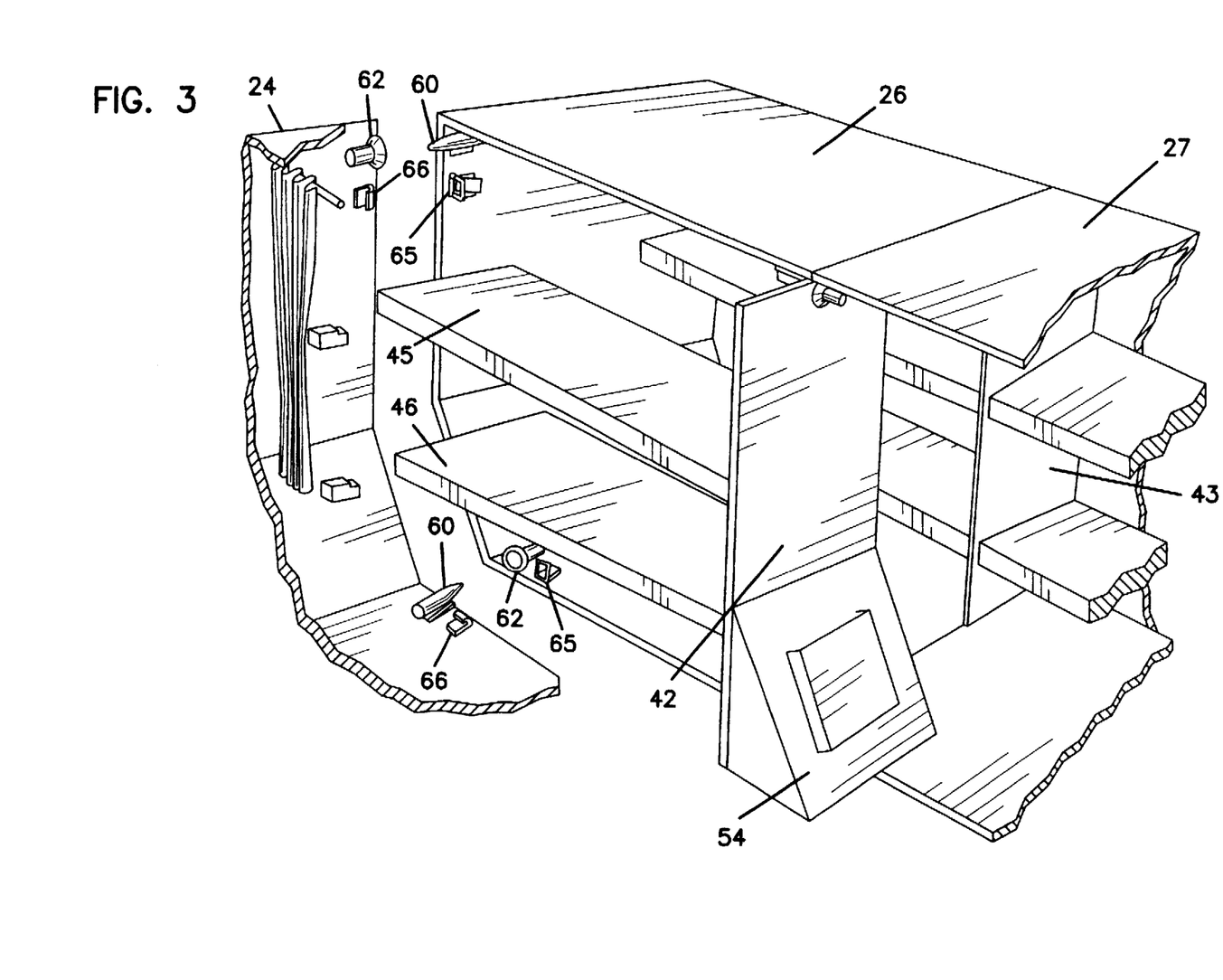
FIG. 3 is a partially exploded perspective view of the arrangement of FIG. 2, showing interior details thereof.

FIGS. 2 and 3 illustrate further details of the nested configuration of the assembly 30. In these views, it can be seen that the inner abutting sides of the modules 24–27 are open, or at least partially open, as with the sides 40 and 41 of the separated module 26 in FIG. 2. As seen here, the interior long interior side of the module 26 is open along its length, and either one of the modules 26, 27 have vertical panels 42, 43 on the abutting wall between them, to define the ends of the sleeping habitats and an aisleway between them. The planes of joinder between the smaller ends of the module pairs 24, 25 and 26, 27, respectively, are thus subdivided to provide end habitats along each longitudinal side, and central habitats that overlap the midplane. Upper and lower berths 45, 46 are mounted in each of the modules, e.g., module 26, to protrude into the adjacent lateral module 24 when the assembly 30 is assembled in nested relation into a unitary housing with multiple habitats. The other laterally abutting module pairs 25, 27, include a projecting restroom 48 (FIG. 2) enclosure that fits within the receiving volume within the adjacent module 25. An extending cover 50 in the top of one module 27 is pivotable upwardly to serve as a door. A handrail 52 on the side of the cover 50 (also seen in FIG. 6) extends downwardly along the entryway region 32. The projecting components and surfaces of the various appurtenances extend at the most 18" from the open side of the module and do not affect transport, positioning or securement of the modules. The center panel 42 that occupies the transverse midplane may abut a convenience panel 54 on which magazines, disposable bags, and other elements are available.

Figure 4:
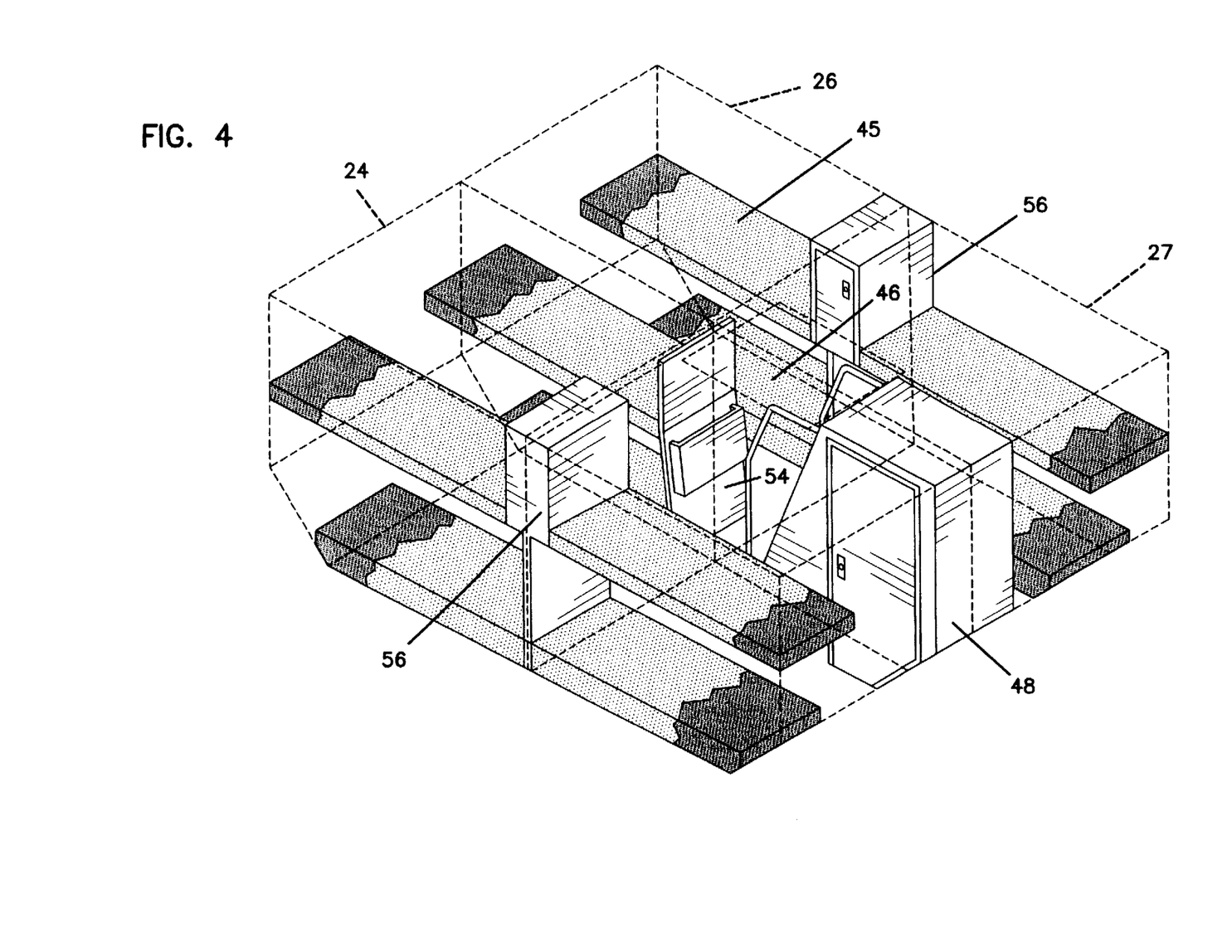
FIG. 4 is an overall perspective view, in simplified form, of the arrangement of FIGS. 1–3, showing the disposition of the sleeping berths therein.

Referring particularly to FIGS. 2 and 4, there are three habitat zones in the assembly 30, namely a zone along each longitudinal side and a central zone, the zones being divided by aisles which extend between the opposite ends of the assembly 30. The sidewall habitat sets comprise upper and lower berths, with the upper berths being separated by storage compartments 56, which however are an optional feature that may be omitted. Longitudinal rails 58 along the interior side of these habitats support hanging curtains 60 for privacy and sound deadening purposes. Folding curtains or even hinged closure parcels may be installed if desired. The center region, about the longitudinal midplane, includes upper and lower berths at one end, but the restroom enclosure 48 and convenience rack 54 occupy the other half. As seen in FIG. 4, this provides adequately separated sleeping habitats, separated by aisles, all being wide enough for comfortable sleeping and movement. The 79" exterior length of the modules 24–27 allows the berths to be of sufficient length to accommodate all but oversized individuals. If desired, the storage cabinets can be made removable so as to permit maximum length to be accommodated, or the berths can be of differential lengths, which can be achieved by having removable dividing panels.

FIG. 3 also shows one suitable arrangement for positioning and locking modules e.g., modules 24 and 26 together. A positioning pin 60 on one of the modules 26 protrudes laterally in the direction of the other module, which incorporates an open-ended converging cone 62 for receiving the tapered end of the positioning pin 60. This coupling is duplicated by a spaced-apart like pair at a different region of the periphery, which provides adequate securement between these adjacent surfaces. Lock mechanisms comprising hinged latches 65 and spaced apart fixed brackets 66 proximate to each positioning pin 60 and its opposite receiving cone 62 can then be engaged to hold the modules firmly in nested position. Similarly, lengthwise connection can be made by other positioning pin and lock arrangements along upper and lower edges of adjacent modules, such as modules 24, 25 and modules 26, 27. Peripheral seals (not shown) can be incorporated in the abutting edge surfaces to ensure isolation.

Figure 5:
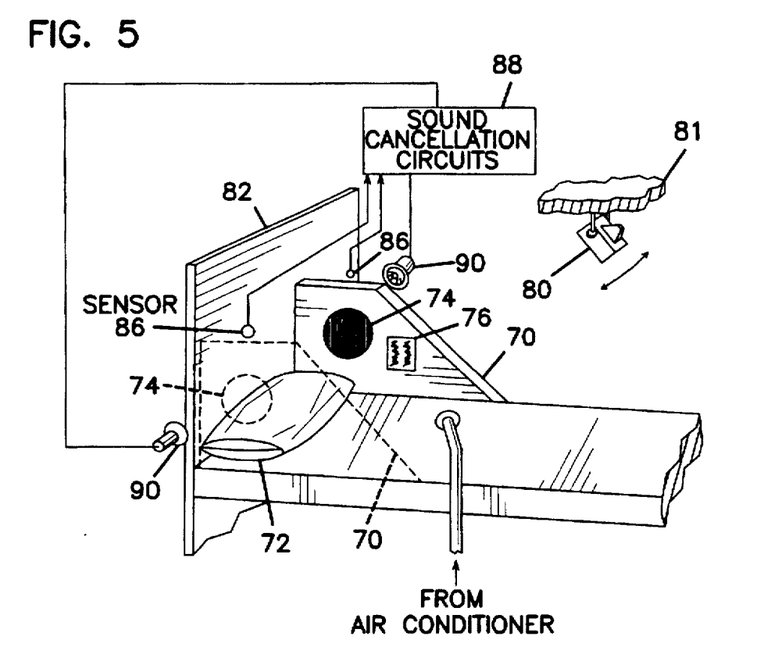
FIG. 5 is a perspective simplified view of an individual sleeping habitat in the system of FIGS. 1–4.

A part of an individual habitat volume is shown in greater detail in FIG. 5, wherein the berth is open at the sides, except for side panels 70 adjacent each end of the passenger's pillow 72. Each side panel 70 includes stereo speakers 74, although headphones may also be utilized, and the passenger is provided with a control panel 76 for selection of audio material and video programming. The video is visible at a pivotable television 80 mounted on the underside 81 of the upper berth or in the roof of the compartment. A virtually silent zone is established between the side panels 70 and the end wall 82 of the compartment, around the head and shoulders of the passenger, by a noise cancellation system which incorporates sensors 86, sound cancellation circuits 88, and separate speakers 90. The sensors 86 detect noise and sounds from sources exterior to the silent zone, and generate antiphase sound to oppose and effectively minimize acoustic noise from exterior sources, whether jet engine, airflow, or other passenger noise. Nonetheless, an announcement made over the stereo speakers 74 system will alert the passenger.

Figure 6:
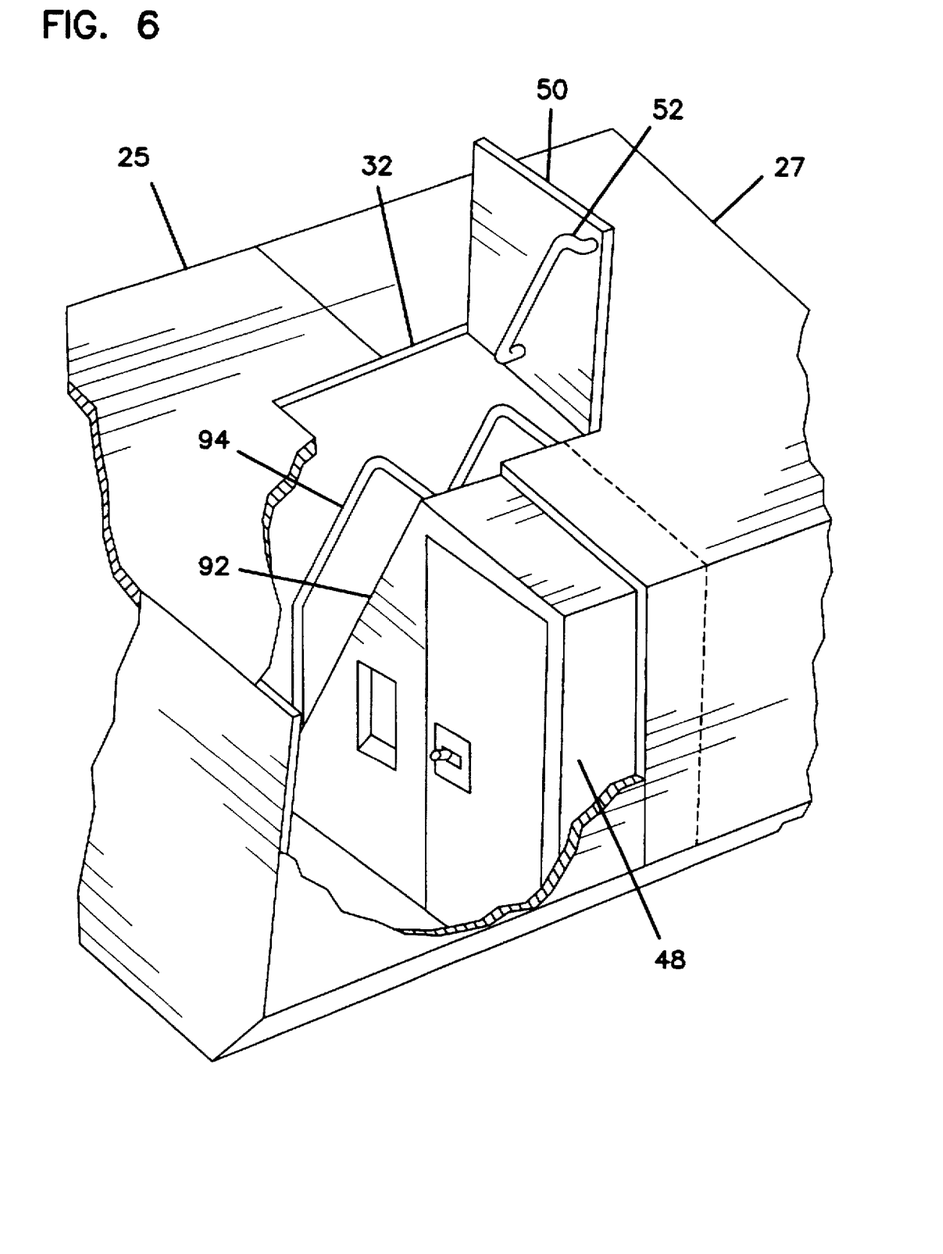
FIG. 6 is a fragmentary perspective view of an entryway system for the arrangement of FIGS. 1–4.

FIG. 6 depicts one suitable arrangement for the entryway 32 in greater detail. The cover door 50 on the module 27 is pivotable upwardly to a raised position at which it may be locked. The railing 52 on the interior side of this door 50 may be grasped for stepping down onto a stairway 92 that extends along one side of the restroom 48 between angled side rails 94. To conserve space, the stairway 92 along the side of the restroom 48 is quite steep, so that for greatest safety, the entry should be made facing the stairs. If this is deemed to be inconvenient, the stair section can be designed to pivot out from the top of the restroom 48 to lessen the steepness of the descent and climb. Another alternative is to employ a side door that leads into an aisle from the cargo floor into the assembly 30. This expedient will usually be used when there is an existing stairs or lift between the passenger level and the cargo level.

Figure 7:
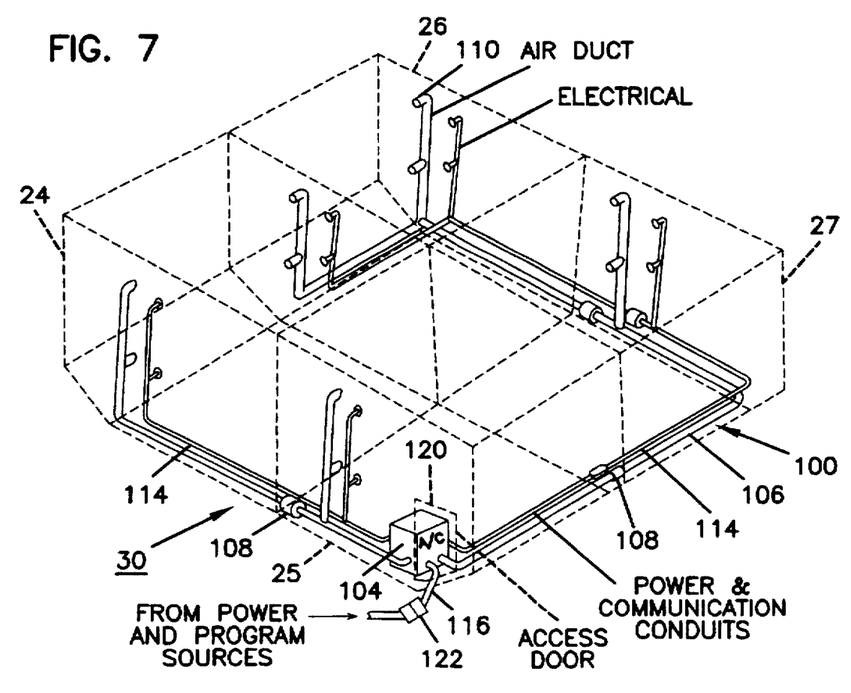
FIG. 7 is a simplified perspective view showing the intercommunication connections, environment control system, and external power access system utilized in one configuration.

FIG. 7 shows in simplified form how power, control, communication and conditioning air are distributed around the interior of the assembly 30, shown in phantom. A dual conduit system 100 is incorporated along the walls in each of the modules 24–27 and includes connector devices at the juncture regions between associated modules 24–27. An insulated air-conditioning unit 104 mounted adjacent the assembly 30 wall is coupled to a duct 106 that extends through the interfaces between each of the habitats via quick attach connectors 108, the flow being controllable by outlet valves 110 at each habitat by the individual passenger. The aircraft pressure control system (not shown) pressurizes the aircraft cargo bay, but the temperature in flight is typically below a desired ambient level, although it may be above for a time. Sensing the ambient level in conventional fashion, the air-conditioning unit 104 heats or cools the distributed air to a chosen range so that delivery may be locally modulated by the passenger. Audio and television programming are provided through a master umbilical cord 114 from sources in the passenger compartment of the aircraft and again individually selected at the control panel 76 (FIG. 5). The sound cancellation circuits 88 may be turned off, if desired, by a passenger, but such action is generally not desirable. Once the modules 24–27 have been nested together in the assembly 30, a ground crew member extends an electrical bus 116 including the power lines and master umbilical cord outwardly from the interior into the cargo bay via a small access door 120, to plug into a connector 122 to power and program sources in the aircraft.

In addition to the periodicals and disposables available at the central rack, the restroom 48 at the end of the assembly 30 and the storage facilities, if used, the passenger has access to water and optional refreshments at the side of the restroom 48. Thus the shared facilities within the enclosed volume of the assembly 30 not only minimize any feeling of confinement but aid in relaxation and acclimatization to the habitat.

As a flight approaches its destination, passengers using the habitats can be informed by the personalized loudspeaker systems to exit their habitats and return via the stairs up through the entryway to the passenger level in the aircraft.

It will be appreciated that, while the invention is described as employed with a standard cargo container configuration as the basis, the form factors of other modules than the LD3 type may alternatively be used. Further, a set of nestable compartments that are unique to the passenger application can be used, where greater height, length or other dimensions are available.

While there have been described above and illustrated in the drawings various forms and modifications in accordance with the invention, it will be appreciated that the invention is not limited thereto, but incorporates all modifications and expedients within the scope of the appended claims.

I claim:

1. A mountable and demountable system for providing sleeping compartments for passengers in an aircraft, comprising:

a set of container modules having outer configurations that each substantially conform to the volumetric configurations of standardized cargo containers, the modules each having at least two open sides and at least two outer side walls, and being configured to nest together to define a single housing bounded by the outer side walls, the modules being joined at facing open sides to define a substantially larger enclosed volume having a multiple spaced apart sleeping compartments disposed to be accessible from the interior of the housing;

sleeping surfaces disposed in the sleeping compartments of the modules such that each is accessible from the interior wherein at least some of the sleeping surfaces protrude from the open sides of the modules into the interior of an abutting adjacent module when nested together, and means in at least one wall of the modules for providing access to the interior of the housing from the exterior.

2. A system as set forth in claim 1 above, wherein the sleeping surfaces are spaced apart and disposed within the modules to define a common area including separating aisles affording passageways to any of the sleeping surfaces to and from the means for providing access.

3. A system as set forth in claim 1 above, wherein the system further includes comfort subsystems within the modules, the sleeping surfaces and the comfort subsystems at least partially extending through the openings in the open sides of the modules before nesting of the modules together, and wherein the system further includes power interconnection means within the modules, and means within the modules for intercoupling the power connection means together, and means in the walls of the nested modules for accessing an exterior power source from the interior of the nested modules.

4. A system for providing sleeping accommodations within the cargo compartment of a passenger aircraft, the system comprising:

a set of four housing modules, each having substantially the outer configuration of a standard cargo container, and each including two at least partially open adjoining sides, the open sides on the different modules being positioned such that the modules nest together at the four corners of a common vertical axis, to form an enclosed substantially rectangular volume having an upper wall;

sleeping surface means disposed in the different modules, the sleeping surface means in at least one of the modules protruding from the open side into the space provided by the adjacent module when the modules are nested together, the open spaces between the ends of the modules being configured to provide aisle space along the interior of the enclosed structure;

at least one of the modules including a restroom housing coupled thereto and protruding outwardly therefrom into the space provided through the open wall of the adjacent module;

power distribution means disposed within each of the modules and including power interconnection means for intercoupling the different modules;

terminal connector means connected to the power distribution means and including interiorly accessible port means in a wall of the nested modules for coupling to an external power supply;

environment control means disposed in at least one of the nested modules and coupled to the power distribution system for providing habitable temperature and humidity levels;

means coupled to the upper wall of the nested modules for accessing into the interior volume of the nested modules, and environment responsive noise cancellation means disposed in the nested modules and coupled to the power distribution means.

* * * * *